US012676165B2

(12) United States Patent
Kaniewska

(10) Patent No.: US 12,676,165 B2
(45) Date of Patent: Jul. 7, 2026

(54) METHOD FOR MIXING MICROPHONE INPUTS, APPARATUS, AND COMPUTER PROGRAM PRODUCT

(71) Applicant: GOODIX TECHNOLOGY (HK) COMPANY LIMITED, Sheung Shui (HK)

(72) Inventor: Magdalena Kaniewska, Leuven (BE)

(73) Assignee: GOODIX TECHNOLOGY (HK) COMPANY LIMITED, Hong Kong (HK)

( * ) Notice: Subject to any disclaimer, the term of this patent is extended or adjusted under 35 U.S.C. 154(b) by 64 days.

(21) Appl. No.: 18/595,546

(22) Filed: Mar. 5, 2024

(65) Prior Publication Data

US 2024/0304209 A1 Sep. 12, 2024

(30) Foreign Application Priority Data

Mar. 10, 2023 (EP) .................................... 23161242

(51) Int. Cl.
*G10L 25/21* (2013.01)
*G10L 21/0208* (2013.01)
(Continued)

(52) U.S. Cl.
CPC .......... *G10L 25/21* (2013.01); *G10L 21/0208* (2013.01); *H04R 3/005* (2013.01);
(Continued)

(58) Field of Classification Search
CPC ..... G10L 25/21; G10L 21/02; G10L 21/0208; G10L 21/0232; G10L 25/78; G10L 25/18;
(Continued)

(56) References Cited

U.S. PATENT DOCUMENTS

2010/0017205 A1* 1/2010 Visser ..................... G10L 19/00 704/E21.002
2013/0325458 A1* 12/2013 Buck .................... H03G 3/3005 704/226
(Continued)

FOREIGN PATENT DOCUMENTS

EP 2673777 B1 * 12/2018 ......... G10L 21/0208

*Primary Examiner* — Yogeshkumar Patel
(74) *Attorney, Agent, or Firm* — Emerson, Thomson & Bennett, LLC; Roger D. Emerson; Peter R. Detorre

(57) ABSTRACT

A method for mixing a plurality of input signals, an apparatus and a computer program product are provided. The method comprises receiving a plurality of current power values associated to a current time interval and a plurality of previous smoothed power values associated to a previous time interval, when it is determined that at least one of the plurality of input signals contains speech, calculating the current smoothed power value for each input signal based on a current power value and a previous smoothed power value, when it is determined that none of the plurality of input signals contains speech, calculating the current smoothed power value for each input signal based on a determined value and the previous smoothed power value corresponding to each input signal and calculating a plurality of mixing gains based on the plurality of current smoothed power values.

20 Claims, 7 Drawing Sheets

(51) Int. Cl.
*G10L 21/0216* (2013.01)
*H04R 3/00* (2006.01)

(52) U.S. Cl.
CPC ............... *G10L 2021/02082* (2013.01); *G10L 2021/02165* (2013.01); *H04R 2499/13* (2013.01)

(58) Field of Classification Search
CPC ....... G10L 21/0216; G10L 2021/02166; G10L 2021/02082; G10L 2021/02165; H04R 3/12; H04R 3/005; H04R 2499/13; H04R 1/406; H04R 2430/00
See application file for complete search history.

(56) References Cited

U.S. PATENT DOCUMENTS

| | | | | |
|---|---|---|---|---|
| 2014/0126745 | A1* | 5/2014 | Dickins | H04R 1/1083 381/94.3 |
| 2015/0215700 | A1* | 7/2015 | Sun | H04R 3/002 381/94.2 |
| 2016/0261951 | A1* | 9/2016 | Matheja | H04R 3/12 |
| 2018/0176682 | A1* | 6/2018 | Goesnar | G10L 21/0364 |
| 2018/0359572 | A1* | 12/2018 | Jensen | H04R 25/407 |
| 2022/0369029 | A1* | 11/2022 | Ma | H04R 3/04 |

* cited by examiner

- Prior art -

- Prior art -

METHOD FOR MIXING MICROPHONE INPUTS, APPARATUS, AND COMPUTER PROGRAM PRODUCT

CROSS REFERENCE TO RELATED APPLICATIONS

The present disclosure claims priority to European Application No. 23161242.5 filed on Mar. 10, 2023, and entitled "SYSTEM AND METHOD FOR MIXING MICROPHONE INPUTS", all of which is incorporated herein by reference in its entirety.

TECHNICAL FIELD

The present disclosure relates to a system for mixing microphone inputs. The present disclosure also relates to a method for mixing microphone inputs.

BACKGROUND

In a multi-talker situation when multiple microphones are available for capturing the speech, speech enhancement can be used to improve the Signal to Noise Ratio (SNR) of every talker, both, during single and overlapping speech.

Let's consider car environment as an example. Inside of a car with at least 2 microphones available, when the car is driving, especially at high speed, a very high level of noise is present (from engine, road, passing traffic, etc.). Additionally, music can be played by the car's loudspeakers. It is important that for every passenger their speech transmitted e.g. during a phone call, is captured by the microphone closest to them to provide best SNR. And when it's more than one person speaking, a proper mix of the different microphone inputs needs to be determined.

In "A dynamic multi-channel speech enhancement system for distributed microphones in a car environment" by Matheja et al. in EURASIP J. Adv. Signal Process. 2013: 191, a system is described that enables creating a combination of an arbitrary pre-defined subset of speakers, e.g., to create an output signal in a hands-free telephone conference call for a far-end communication partner. The drawback of this solution is its complexity. Every input channel is first processed in frequency domain to cancel interfering talkers, suppress noise and estimate speaker activity. Input mixing (dynamic signal combination) is then done also in frequency domain as the last step in the full system as shown in FIG. 1A. This input mixing is performed based on power ratios between the pre-enhanced microphone signals.

Another known group of systems to mix microphone signals are gain sharing auto-mixers. Examples of such kind of systems can be found in "Automatic microphone mixing", by Dan Dugan, Journal of the Audio Engineering Society 23.6, 1975, pp. 442-449, and in U.S. Pat. No. 3,814,856 A, which disclose analogue systems based on input levels and wherein the gain for each input channel is determined with the restriction that constant system gain is preserved. FIG. 1B shows an example to such a system.

It is also known to add further modifications to systems like the one shown in FIG. 1B, included adding Voice Activity Detection (VAD), de-reverberation or noise suppression to each input channel as described in, for example, "Automatic microphone mixing for a daisy chain connected multi-microphone speakerphone setup" by D. Johansson, M.S. Thesis, Department of Physics, Umea University, 2016. The main limitation of these systems based on gain sharing auto-mixers is that they do not work with very low SNRs. Known modified solutions that work for very low SNRs will add signal processing on each channel input, thereby significantly increasing complexity.

Cars and other voice and audio systems can comprise different possible configurations (and number) of microphones (including multiple arrays and distributed microphones) such that an algorithm processing the input signals from the different microphones has to provide similar performance for each configuration. Furthermore, microphones being placed at some distance from every speaker (not personal mics) may provide lower SNR. Also, severe noise (engine, road, fans . . . ) and music playback from entertainment system will result in lower SNR and risk of steering the algorithm towards dominating noise instead of talkers. Finally, many voice processing systems usually require low complexity and low delay.

Low complexity and low delay requirements limit the possibilities to use certain signal processing techniques that would help the main task. With a high number of microphones, it's not possible to enhance all microphones before mixing (to achieve higher SNR). The enhancement (noise and echo suppression) can happen only after the mixing (on 1 channel). In some cases, due to limited platform resources, it's not even possible to pre-process the microphones in frequency domain-all pre-processing before mixing has to be done in time-domain, which is less complex but more challenging. Frequency domain processing usually requires more millions of cycles per second (MCPS) (coming from Fast Fourier Transforms (FFTs) of all used signals and processing done per bin) and more memory (for storing the FFTs of multiple signals or additional frequency domain features).

When designing input mixing of signals coming from several microphones important aspects to take into consideration are:

- Flexibility with respect to microphone configurations
- Robustness to noise
- Achieving highest possible SNR for each speaker while keeping stable output level (without level fluctuations when speakers start/finish talking)
- Low complexity.

Thus, a new approach is needed to provide improved speech enhancement algorithms that mix input signals from several microphones into one output without the cited disadvantages.

SUMMARY

According to the invention, there is provided a method for mixing a plurality of input signals, the method comprising receiving, by a processor, a plurality of current power values associated to a current time interval and a plurality of previous smoothed power values associated to a previous time interval, wherein each of the plurality of current power values and each of the plurality of previous smoothed power values corresponds respectively to each of the plurality of input signals; determining, by the processor, whether at least one of the plurality of input signals contains speech; calculating, by the processor, a plurality of current smoothed power values respectively for the plurality of input signals at the current time interval; and mixing the plurality of input signals based on the plurality of current smoothed power values; wherein calculating the plurality of current smoothed power values comprises calculating a current smoothed power value for each input signal of the plurality of input signals as follows:

if it is determined that at least one of the plurality of input signals contains speech, calculating the current smoothed power value for each input signal based on a current power value among the plurality of current power values and a previous smoothed power value among the plurality of previous smoothed power values, wherein the current power value and the previous smoothed power value correspond to the each input signal;

if it is determined that none of the plurality of input signals contains speech, calculating the current smoothed power value for each input signal based on a determined value and the previous smoothed power value corresponding to each input signal.

The determined value may be an average of the plurality of previous power values. Alternatively, the determined value may be zero. In another embodiment according to the invention, the determined value may be an estimate of an average speech power on a plurality of input signals. The determined value may be any suitable constant value and may be stored in a memory. This allows to slowly reset current powers for all the input signals to the same value in case no speech is detected in the input signals.

The plurality of calculated current smoothed power values may be used for calculating a plurality of mixing gains wherein the each of the plurality of calculated current smoothed power values and each of the plurality of calculated mixing gains correspond respectively to each of the plurality of input signals. The calculated mixing gains may be used then for mixing the plurality of input signals to generate an output signal. For instance, the output signal may comprise a combination or sum of the input signals respectively weighted by the calculated mixing gains. The output signal may be generated in any other suitable way based on the input signals and the calculated mixing gains.

The disclosure may be used to provide speech enhancement for instance for hands-free calling, in-car communication and as speech recognition front-end. It allows to estimate mixing factors for all available microphones to combine them into one output before further enhancement. Proper mixing of the microphones, giving the highest SNR, ensures best performance of the next enhancement steps of an audio processing algorithm. This way less degraded, more intelligible speech can be obtained on the output. The mixing gains for the microphones can be calculated to combine all available microphones channels into the best possible one channel output. This is done through estimating the probability of each microphone to have the best SNR in current time step.

Determining, by the processor, whether at least one of the plurality of input signals contains speech may comprise determining whether a probability of at least one of the plurality of input signals containing speech is above a threshold value. This is a very efficient way of determining whether any of the input signals comprises speech.

The current time interval starting time may be equal to the previous time interval ending time.

The method may further comprise storing, by the processor, the plurality of current smoothed values in a memory for calculating a plurality of next smoothed power values respectively for the plurality of input signals at a next time interval. This allows for efficiently using the previous smoothed power values in the calculation of the current smoothed power values.

Mixing the plurality of input signals may comprise calculating a plurality of mixing gains for the plurality of input signals wherein a mixing gain among the plurality of mixing gains for an input signal among the plurality of input signals is determined based on a current smoothed value among the current smoothed values corresponding to the input signal and an average of the plurality of current smoothed values.

The method may further comprise calculating, by the processor, the plurality of current power values associated to the current time interval wherein calculating a current power value among the plurality of current power values associated to an input signal among the plurality of inputs signals comprises:

splitting a frequency range of the input signal into a plurality of frequency subranges;

calculating a plurality of power weight values respectively for the plurality of frequency subranges based on SNR of the input signal in corresponding frequency subrange; and calculating the current power value based on the plurality of power weight values.

The plurality of power weight values of the plurality of frequency subranges may be further calculated as a ratio between the SNR of the input signal in corresponding frequency subrange and an average SNR of the input signal in the plurality of frequency subranges.

Calculating the current power value based on the plurality of power weight values may comprise weighing power of each frequency subrange of the plurality of frequency subrange by applying corresponding power weight among the plurality of power weight values and adding the weighted powers. This allows to weight differently the contribution of each subrange to the calculation of the current power values such that subranges with higher noise contribute less.

DESCRIPTION OF DRAWINGS

The present disclosure will be discussed in more detail below, with reference to the attached drawings, in which.

The figures are meant for illustrative purposes only, and do not serve as restriction of the scope or the protection as laid down by the claims.

DETAILED DESCRIPTION OF EMBODIMENTS

Figure 1A:
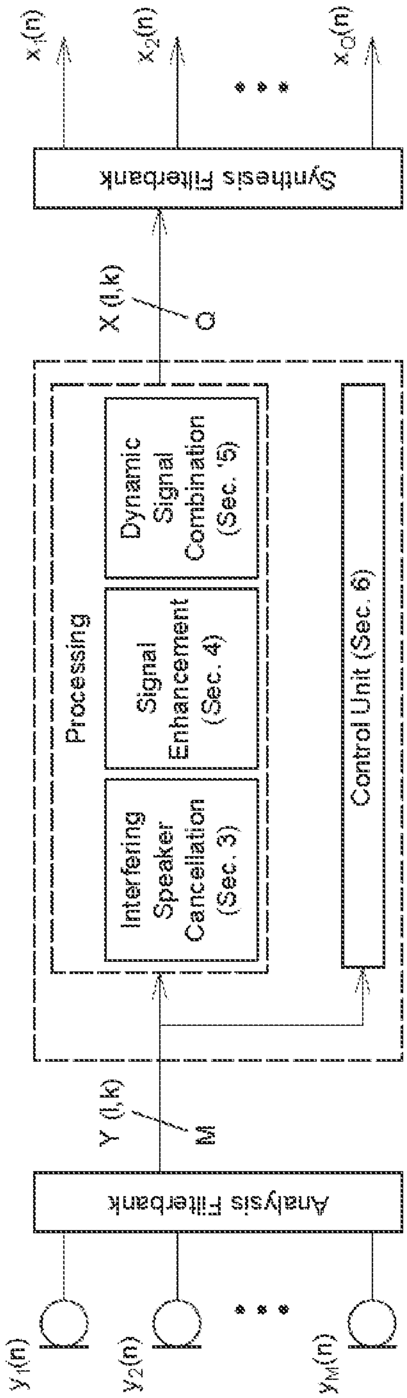
FIG. 1A schematically shows a system for mixing input microphone signals according to the prior art.
Figure 1B:
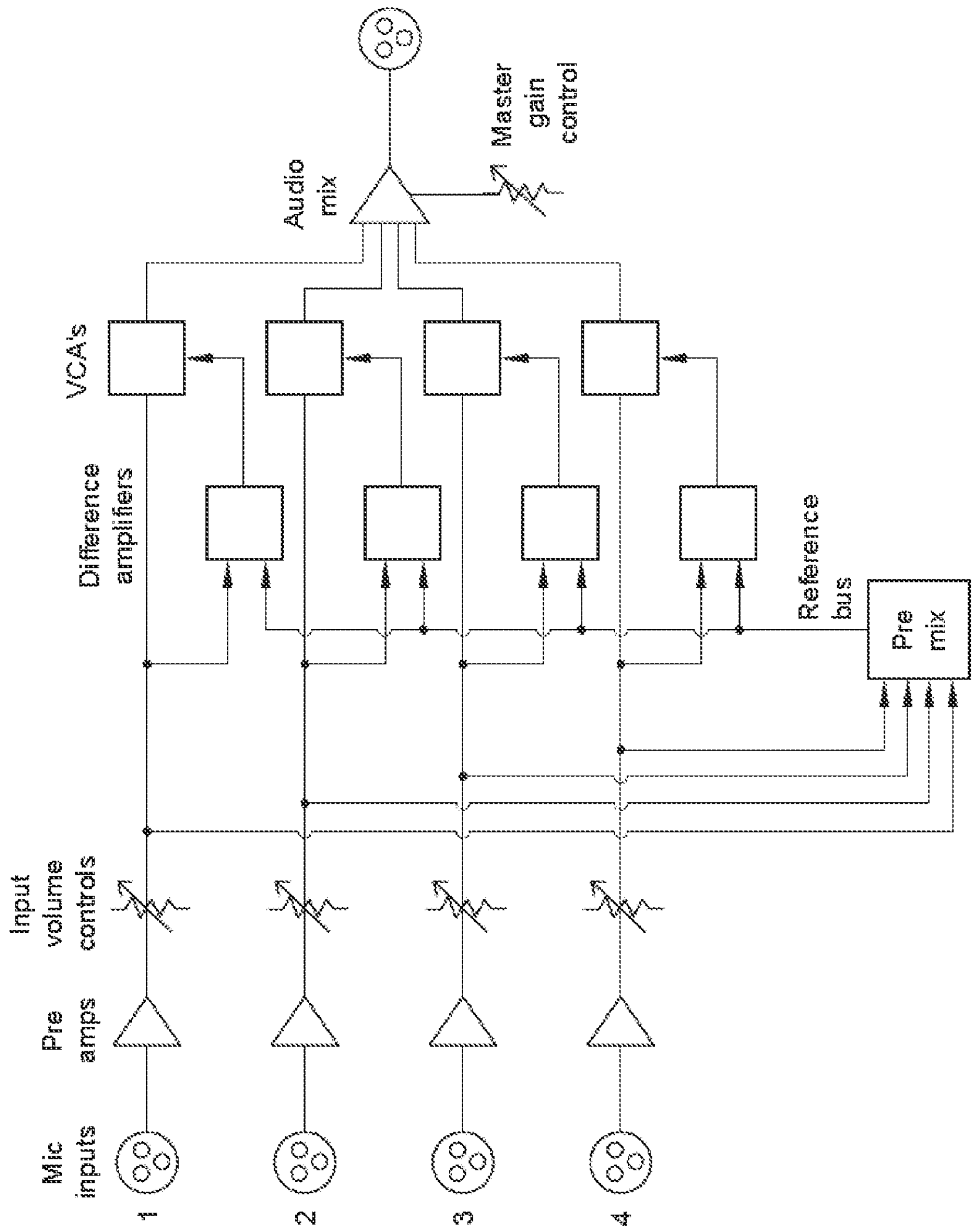
FIG. 1B shows schematically shows another system for mixing input microphone signals according to the prior art.
Figure 2:
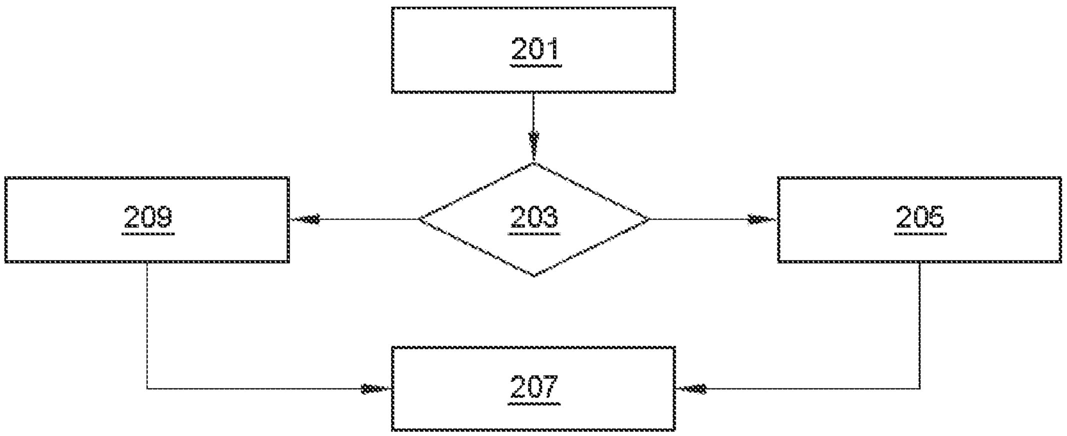
FIG. 2 shows a flowchart diagram of a method according to an embodiment of the invention.

FIG. 2 shows a flowchart diagram of a method for mixing a plurality of input signals according to the invention.

In step 201 of the method shown in FIG. 2, a plurality of current power values associated to a current time interval and a plurality of previous smoothed power values associated to a previous time interval are received by a processor. The plurality of input signals may be received, respectively from a plurality of microphones. The plurality of current power values corresponds respectively to the plurality of input signals. In the same way, each of the plurality of previous smoothed power values corresponds respectively to each of the plurality of input signals.

In step 203 of the method shown in FIG. 2, the processor determines whether at least one of the plurality of input signals contains speech.

If in step 203 the processor determines that at least one of the plurality of input signals contains speech, the method proceeds to step 205 wherein the processor calculates a current smoothed power value at the current time interval for each one of the plurality of input signals, wherein a current smoothed power value for each one of the input signals is calculated based on a current power value among the plurality of current power values and a previous smoothed power value among the plurality of previous smoothed power values, wherein the current power value and the previous smoothed power value correspond to each one of the input signals.

From step 205 the method proceeds to step 207 wherein the processor mixes the plurality of input signals based on the current smoothed power values calculated in step 205.

If in step 203 the processor determines that none of the plurality of input signals contains speech, the method proceeds to step 209 wherein the processor calculates a current smoothed power value for each of the plurality of input signals at the current time interval based on a determined value and the previous smoothed power value corresponding the input signal among the plurality of input signals for which the current smoothed power value is being calculated.

From step 209 the method proceeds to step 207 wherein the processor mixes the plurality of input signals based on the current smoothed power values calculated in step 209. The determined value may be an average of the plurality of current power values. Alternatively, the determined value may be zero. In another embodiment according to the invention, the predetermined value may be an estimate of an average speech power on a plurality of input signals. The determined value may be any suitable constant value and may be stored in a memory. This allows to slowly reset current powers for all the input signals to the same value in case no speech is detected in the input signals.

The method of FIG. 2 has been explained using power calculation. However, energy calculations may be used instead of the power ones. In the rest of the description, the different embodiments of the disclosure will be explained using power calculations. However, this is a non-limiting feature and power calculations could be replaced with energy calculations.

Figure 3:
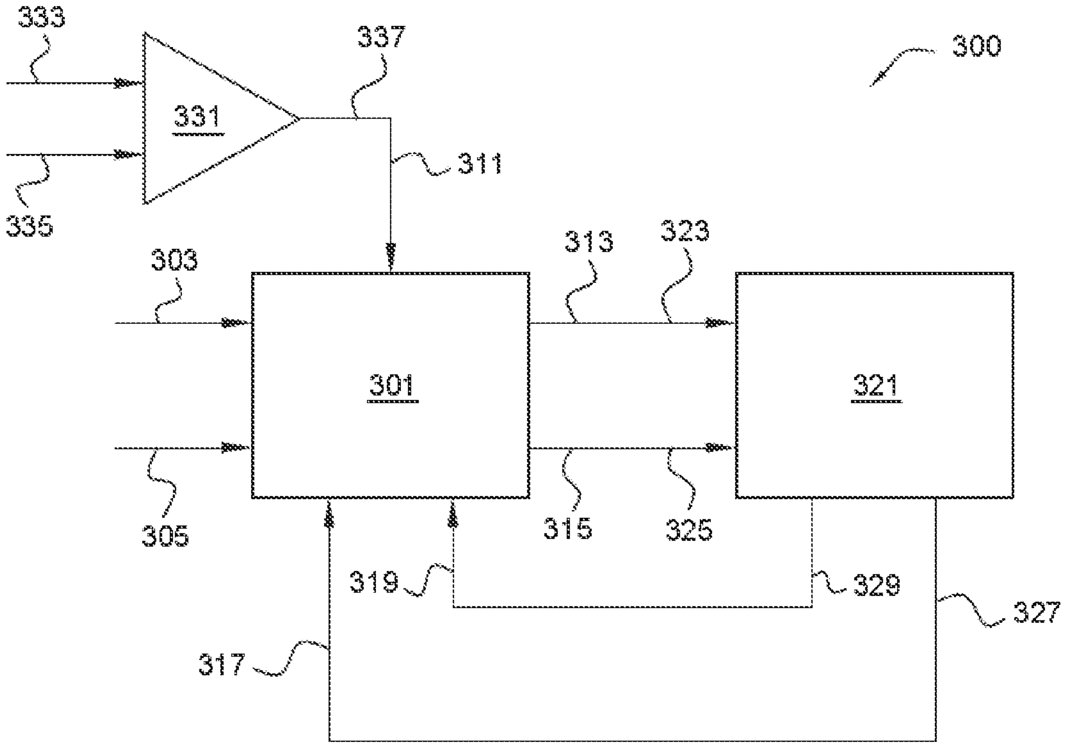
FIG. 3 shows schematically probability estimation means according to an embodiment of the invention.

FIG. 3 shows a schematic diagram of a probability estimation means 300 for mixing two input signals according to an embodiment of the invention. Although FIG. 3 shows an embodiment wherein two input signals from two microphones are considered, this is a non-limiting example, and the probability estimation means 300 may be for mixing any number of input signals.

The probability estimation means 300 comprises a processor 301 and a memory 321. The processor 301 comprises a first input 303 and a second input 305 configured to receive respectively a first current power value and a second current power value which has been calculated in a current time interval. The first current power value corresponds to a first input signal from a first microphone and the second current power value corresponds to a second input signal from a second microphone. For instance, the processor 301 may be further connected to power calculation means (shown in FIGS. 4A-B). The power calculation means may be configured to receive the first and second input signals during a current time interval and calculate the power of those signals thereby generating the first and the second current power values. The power calculation means may be configured to send the first and second current power values respectively to the first and second inputs 303 and 305 of the processor 301.

The processor 301 comprises further a third input 317 and a fourth input 319 configured to receive respectively a first previous smoothed power value and a second previous smoothed power value calculated by the processor 301 in a previous time interval. The ending time of the previous time interval may be the same or close to the starting time of the current time interval. The first previous smoothed power value and the second previous smoothed power value corresponds respectively to the first input signal and to the second input signal.

The processor 301 comprises a first output 313 and a second output 315 and is configured to calculate a first current smoothed power value of the first input and a second current smoothed power value of the second input, and to send the first current smoothed power value to the first output 313 and to send the second current smoothed power value to the second output 315.

The probability estimation means 300 may comprise further a memory 321 or any other suitable storage means comprising a first input 323 and a second input 325. The first input 323 of the probability estimation means 300 may be configured to receive the first current smoothed value from the processor 301 to be stored in the memory 321. The second input 325 of the probability estimation means 300 may be configured to receive the second current smoothed value from the processor 301 to be stored in the memory 321.

The memory 321 may further comprise a first output 327 and a second output 329. The first output 327 of the memory 321 is connected to the third input 317 of the processor 301 and configured to send the first previous smoothed power value to the third input 317, wherein the first previous smoothed power value was calculated by the processor 301 in a previous time interval and sent and stored in the memory 321 in said previous time interval.

In the same way, the second output 329 of the memory 321 is connected to the fourth input 319 of the processor 301 and configured to send the second previous smoothed power value to the fourth input 319, wherein the second previous smoothed power value was calculated by the processor 301 in a previous time interval and sent and stored in the memory 321 in said previous time interval.

The processor 301 comprises further a fifth input 311 configured to receive a control signal indicating whether at least one of the first and second input signals contains speech.

For instance, the probability estimation means may comprise further a comparator 331 comprising a first input 333 configured to receive a probability of one of the first and second input signals containing speech, a second input 335 configured to receive a threshold value, and an output 337 connected to the fifth input of the processor 301 and configured to provide the control signal by comparing the first input 333 of the comparators 331 and the second input 335 of the comparator 331. For instance, the control signal may comprise one bit and the comparator 331 may send a zero to its output 337 if the probability of speech received at the first input 333 of the comparator 331 is lower than the threshold value received at the second input 335 of the comparator 331, thereby indicating that it has been determined that none of the first and second input signals contains speech. The comparator 331 may send a one to its output 337 if the probability of speech received at the first input 333 of the comparator 331 is higher or equal to the threshold value received at the second input 335 of the comparator 331, thereby indicating that it has been determined that at least one of the first and second input signals contains speech. Any other suitable way of determining whether at least one of the first and second input signals contains speech may be used. In this way, in an alternative embodiment, the probability estimation means 301 of FIG. 3 may not comprise the comparator 331.

The processor 301 is further configured to calculate the first and the second current smoothed power values at the current time interval as follows.

If the control signal received at the fifth input 311 indicates that it was determined that at least one of the first and second input signals contains speech in the current time interval, the first current smoothed power value is calculated based on the first current power value and the first previous smoothed power value received at the third input 317 and the second current smoothed power value is calculated based on the second current power value and the second previous smoothed power value received at the fourth input 319.

If the control signal received at the fifth input 311 indicates that it was determined that none of the first and second input signals contains speech in the current time interval, the first current smoothed power value is calculated based on an average of the first smoothed power value and the second smoothed power value respectively received at the third input 317 and the fourth input 319 of the processor 301, and based on the first previous smoothed power value received at the third input. In a similar way, the second current smoothed power value is calculated based on the second previous smoothed power value received at the fourth input 319, and based on an average of the first previous smoothed power value and the second previous smoothed power value respectively received from the memory 321 at the third input 317 and at the fourth input 319 of the processor 301.

The processor 301 is configured to send the calculated first and second current smoothed power values respectively to the first and second outputs 313 and 315 which are connected to the first and second inputs 323 and 325 of the memory 321. The memory 321 is configured to store the first and second current smoothed power values as the first and second previous smoothed values which will be sent to the first and second outputs 327 and 329 of the memory 321 and received at the third and fourth inputs of the processor 301 to be used in a next current time interval to calculate again the new first and second current smoothed power values.

The estimation means 300 may be connected to mixing means which will mix the first and second input signals based on the calculated first and second current smoothed power values.

Figure 4A:
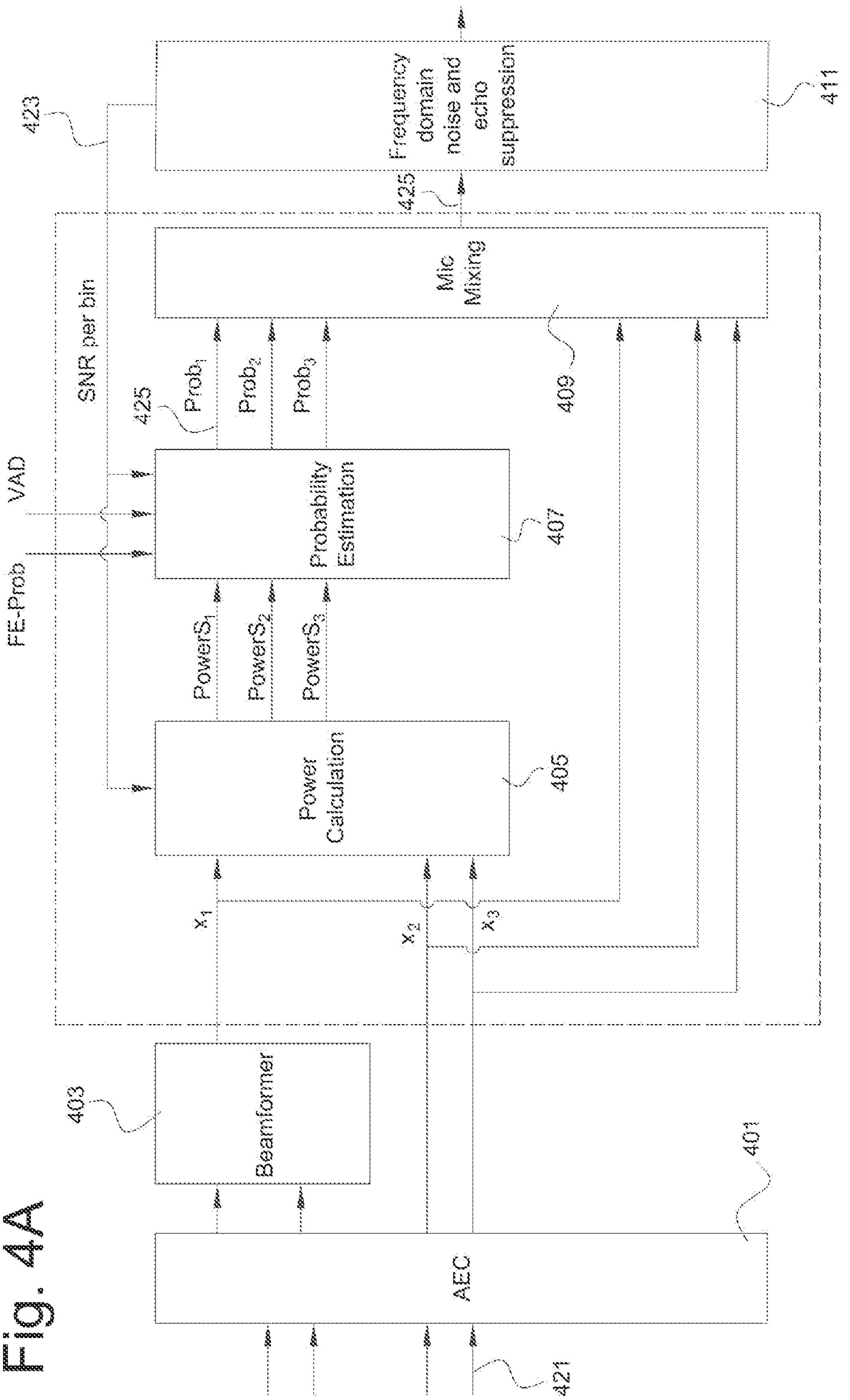
FIGS. 4A and 4B shows schematically a system for mixing input signals according to an embodiment of the invention.

FIG. 4A shows schematically a system for mixing input signals and frequency domain noise and echo suppression means 411 according to embodiments of the invention.

The system 400 comprises acoustic echo cancellation (AEC) means 401, beamformer means 403, power calculation means 405, probability estimation means 407, mixing means 409 and noise and echo suppression means 411. The AEC means 401, the beamformer means 403 and the noise and echo suppression means 411 are optional blocks and only used to provide pre-enhancement of the input signals to improve the performance of the system, and to provide additional information, such as SNR estimate, for the mixing of the input signals.

The system 400 is configured to receive a plurality of input signals 421, a control signal (VAD) and Signal to Noise Ratio (SNR) estimate 423. The output signal of the mic mixing module of the system 400 comprises a weighted sum of all the input channels 421.

The power calculation means 405 provides a low complexity pre-processing that removes the bias of noise from the current power values corresponding to the plurality of input signals 421. The power calculation means 405 is configured to receive a Signal to Noise Ratio (SNR) estimate 423 and determine the bands that have lower SNR to apply weighting such that those bands contribute less to the calculation of the current power values for the input signals without the need for full pre-enhancement, i.e. noise suppression, of every microphone associated to the input signals 421.

The probability estimation means 407 calculates for each input signal 421 the probability 425 that, in a current time interval, the given microphone provides better SNR than the other microphones. The probability estimation means 407 may be similar to the probability estimation means 300 shown in FIG. 3 and may be configured to calculated a plurality of current smoothed power values based on the current power values calculated by the power calculation means 405 and previous smoothed power values to allow that the probabilities 425 are updated only during speech, re-adapt fast to changing speakers and provide steady output level. The power calculation means 405 may calculate the current power values in time domain.

In FIG. 4A the system 400 is configured to receive four microphone signals 421 wherein two of those four microphones signals 421 may be received respectively from two microphones located in a close spaced array and the other two of those four microphones signals 421 may be received respectively from other two microphones far-spaced when one person is speaking. For instance, two microphones are located in a close spaced array whose signals are input to AEC means 401 and then the two outputs of AEC means 401 are input to Beamformer means 403. Two microphones are far-spaced whose signals are input to AEC means 401 and then the two outputs of AEC means 401 are input to the power calculation means 405. For instance, the four microphone signals 421 may represent a configuration of four microphones in a car wherein two of the four microphones are located in the front between a driver and a passenger sits, e.g. next to a rear view mirror and 15 centimeters one apart from the other, and the other two microphones may be located in the back of the car and above the back windows such that the two microphones are located more than 50 centimeters apart from each other and from the other two front microphones. This is an exemplary and non-limiting microphone configuration. The system of FIGS. 3 and 4 may be applied to any number of microphones signals and to different configurations.

The AEC means 401 is an adaptive filter for echo cancellation and is configured to reduce echo dominance over the near end signal as echo can be present in the input signals 421, for instance, during voice calling.

For the microphones located closer to each other beamforming may be applied by the beamformer means 403 (beamforming is done for microphones signals whose microphones are located less than 25 centimeters from each other). Furthermore, mixing a plurality of input signals is used for microphones that are spaced around more than a predetermined distance from each other, 25 centimeters for instance. For the microphones located far away from each other, beamforming stops working. In FIG. 4A, the signals of the two microphones which are spaced close to each other are processed by AEC module and generate the corresponding AEC module output $x_1$ and then the AEC module output $x_1$ is input to the beamformer means 403. The signals of the other two microphones which are spaced farther away are processed by the AEC module and generate the corresponding AEC module outputs $x_2$ and $x_3$. It is beneficial to use beamformer means 403 to process two closely spaced microphone signals to generate the output $x_1$ of the beamformer means 403 because the beamformer can adapt towards the active talker. In this way, the SNR on the output of the beamformer means 403 ($x_1$) will be higher than on the inputs. The power calculation means 405 can process the output of the beamformer means 403 ($x_1$) and the other two microphone signals processed and outputted by the AEC 401 ($x_2$ and $x_3$). In this way, the microphones can be installed anyway in the car and be correctly processed. In some embodiment, the beamformer means is optional. It is beneficial to mix a plurality of input signals which comes from at least one of the microphone which is 25 centimeters away from the other microphone without processing them first at the beamformer means 403 as beamforming does not work properly for these distances.

Figure 5:
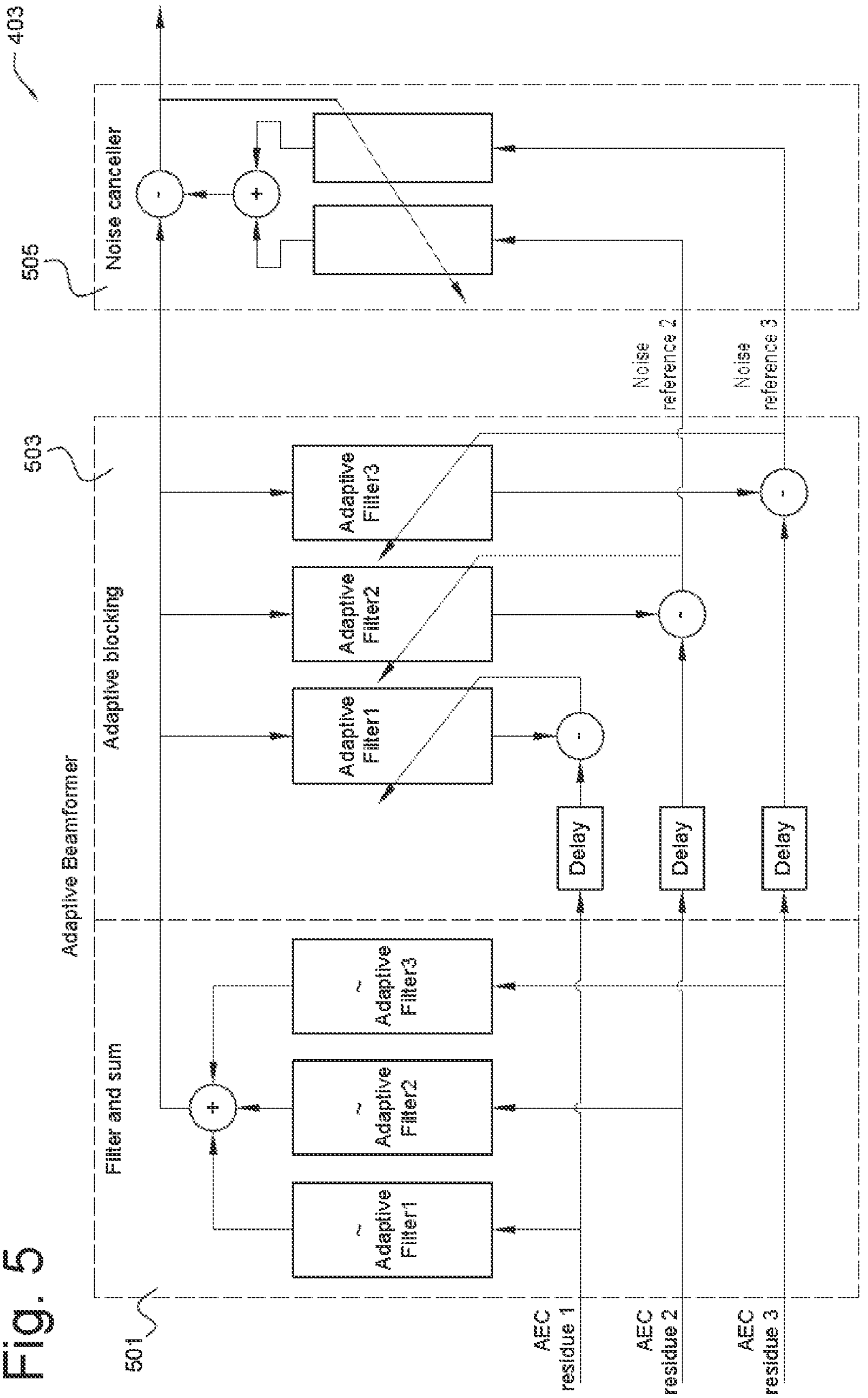
FIG. 5 shows schematically the beamforming means of FIGS. 4A-B according to an embodiment of the invention.

The beamformer means 403 may be an adaptive beamformer that converges towards the speech source among the input signals 421 with highest power. FIG. 5 shows a non-limiting example of the beamformer means 403. The beamformer means 403 comprises filter-and-sum means 501, adaptive blocking means 503 and noise canceller means 505 such as, for instance, a generalized sidelobe canceller. Alternatively, a set of two fixed beamformers looking in two directions (front left and right passengers in the car) may be used. The beamformer outputs provide improved SNR compared to its inputs.

The noise and echo suppression means 411 is configured to suppress interfering signals providing cleaner, more intelligible output signals. The SNR estimate 423 may be generated by the noise and echo suppression means 411 to enhance the power calculation means performance. The embodiment shown in FIG. 4A contains a feedback loop, that is the power calculation means 405 and the probability estimation means 407 in the current frame have as input the SNR estimate 423 which was calculated by the noise and echo suppression means 411 in the previous frame. This one-frame delay between the SNR estimate 423 and the other inputs to the power calculation means 405 and the probability estimation means 407 does not impact the performance of both modules because SNR in this case is a long-term feature, which means it changes slowly over time and therefore the past provides a good representation of the present conditions. For the power/probabilities estimation in the first frame an initial SNR value has to be set in the algorithm. In other embodiments other means except the noise and echo suppression means 411 can be used to determine the SNR.

The control signal VAD may be calculated for all the input signals 421 aggregated together such that detection of speech depends on someone in the car talking, independently of their position in the car. Alternatively, several control signals VAD may be calculated for each input signal 421 separately at the price of increased complexity.

The power calculation means 405 is configured to estimate a plurality of current power values for the plurality of input signals 421. In a possible embodiment, it may be assumed that the noise on all input signals 421 is similar and that the power of car noise is concentrated in its lower band (below 4 kilohertz). In this way, the lower band of the input signal may have lower SNR. In this case, the higher the noise level, the more the current power values should depend on the upper band part of the input signals as the lower band may contain mostly noise. For that, the power calculation means 405 may be configured to calculate each of the current power values as a weighted sum of the current power values of the two bands such that the power of the lower band has low weight and the upper band power has higher weight. Further details related to the power calculation means 405 will be explained in relation to FIG. 6.

The SNR estimate 423 may be used to weight differently the contribution of lower and upper band energies when calculating the current power values. Other ways of estimating noise level could also be employed to weight the contribution of the lower and upper bands to the calculation of the current power value of the corresponding input signal. Alternatively, more than two subbands of each input signal may be used for calculating the current power values at the power calculation means 405.

The probability means 407 is configured to estimate the probability 425 of each input signal corresponding to a microphone close to an active speaker based on the current power values of the input signals calculated by the power calculation means 405. By providing proper power smoothing, the probability means 407 avoids updating the probabilities 425 based on noise only or echo while still providing fast enough switching between talkers and at the same time avoiding level fluctuations. The current smoothed power values are then used to calculate for each input signal the ratio of its power to the average power of other input signals. Based on these ratios the probabilities 425 for all microphones are calculated. The sum of the probabilities 425 is forced to one. This allows to use the probabilities 425 directly as the mixing gains for the input signals 421 at the mixing means 409. In this way, an output signal at the output 425 of the mixing means 409 can be calculated by the mixing means 409 as a combination of the input signals wherein each input signal is weighted by the corresponding mixing gain.

Figure 4B:
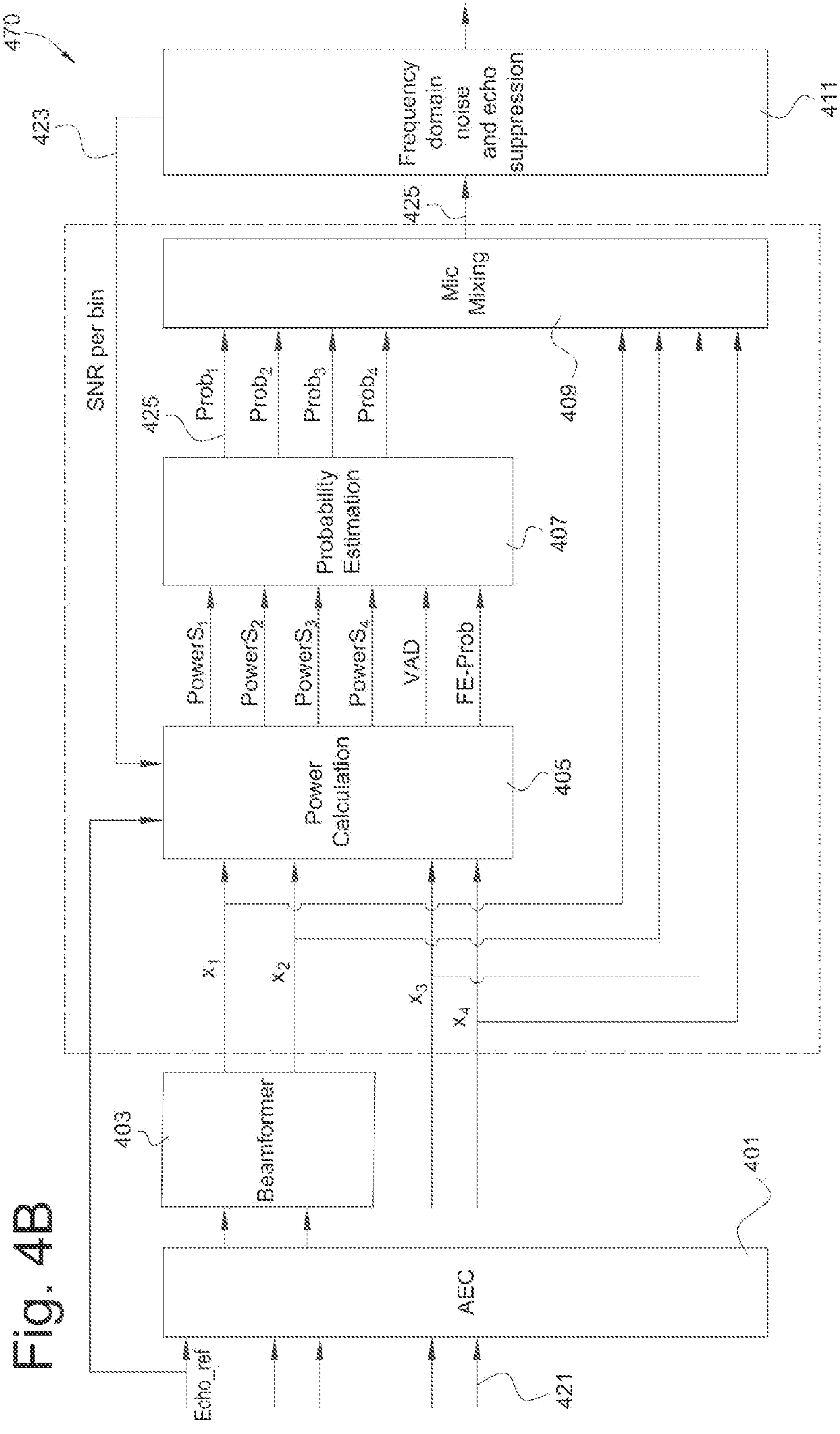

In FIG. 4B, the system 470 is similar to the system 400 of FIG. 4A but instead of using an adaptive beamformer, which adapts towards the currently active speaker and returns only one output (from the direction of the active speaker), a beamformer fixed in two directions is used, and returns a separate output from each of those directions. This embodiment is especially advantageous for a car-specific use case, wherein the fixed beamformer can be directed e.g. towards the driver and the front seat passenger. For other use-cases a beamformer fixed towards one or more than two directions could also be used.

The AEC means 401 of FIG. 4B receives as input an echo reference signal echo_ref which is also provided as an input to the power calculation means 405. The microphone input (that contains echo) and echo reference are passed to the AEC, which aims to estimate the echo portion in the microphone input. The output of AEC is called the echo estimate and the AEC residual (which is the microphone input minus echo estimate). The AEC residual and echo estimate are provided at the output of the AEC means 401 and it may be provided as input to further modules in order to determine the presence of echo in current frame. In the same way, the echo reference signal echo_ref may be also provided as input to further modules in order to determine the presence of echo in current frame.

In a 2-way communication system, acoustic echo occurs in a voice communication terminal as a result of acoustic coupling between the speaker and microphone. The far-end (or downlink) signal played back by the speaker(s) of the system is transmitted to the microphone(s). The microphone input(s) are therefore a mixture of near-end and echo signals. The AEC means 401 of FIG. 4B aims to remove the echo from that mixture. The most common method to do that is an adaptive filter that uses echo reference (the downlink signal before speaker playback) to estimate the echo signal in the microphone input(s). Ideally, AEC would remove all echo from the mixture leaving only near end. In practice not all echo is removed.

For the microphones located closer to each other, beamforming may be applied by the beamformer means 403 (usually beamforming is done for microphones located less than 25 centimeters from each other). The beamformer means is configured to generate the outputs $x_1$ and $x_2$ such that the power calculation means 405 can process the output of the beamformer means 403 ($x_1$ and $x_2$ in FIG. 4B) and the other two microphone signals processed and outputted by the AEC 401 ($x_3$ and $x_4$ in FIG. 4B).

The control signal VAD and a far end probability signal which is an estimate of the probability of far end signal presence (FE_prob) are calculated by the power calculation means 405 which is configured to estimate a plurality of current power values for the plurality of input signals 421. Alternatively, the control signal VAD and the far end probability signal FE_prob may be calculated by a separate module. It should be noted that the VAD is estimated for the speech presence in the near end signal, which is the desired signal, while the echo is an interfering signal. Throughout the description, the term "speech" refers to desired near end speech.

Figure 6:
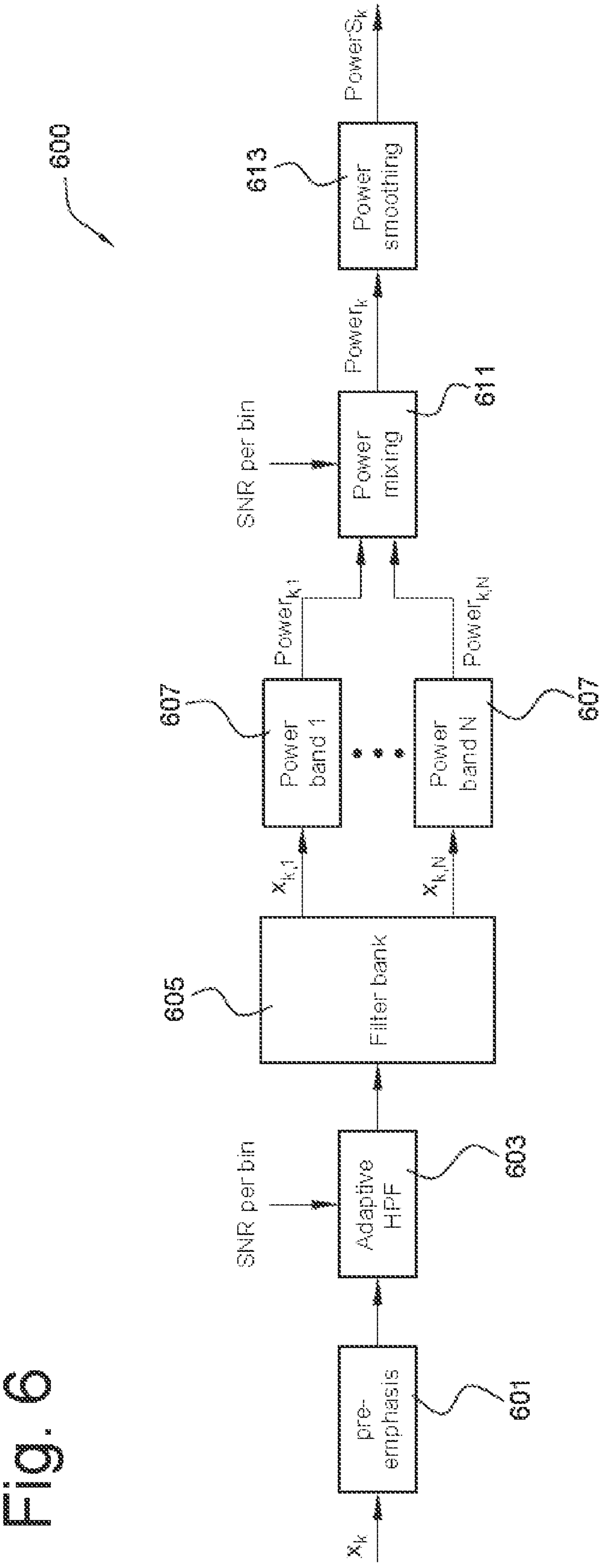
FIG. 6 shows schematically the power calculation means of FIGS. 4A-B according to an embodiment of the invention.

FIG. 6 shows schematically the power calculation means 405 of FIG. 4A for one of the input signals 421 according to an embodiment of the invention. The power calculation means 405 comprises as many branches as the one shown in FIG. 6, as input signals has the system. In the diagram the input signal goes first through pre-emphasis filter 601 (if it wasn't applied earlier in the algorithm) configured to balance low and high frequencies since in speech signal low frequencies are dominant. In an alternative embodiment, the power calculation means 405 may not have the pre-emphasis means 601. The power calculation means 405 comprises further an adaptive high pass filter 603 configured to filter out the lowest frequencies depending on SNR, i.e., the cutoff frequency of the adaptive high pass filter 603 varies in each time interval or frame depending on the characteristics of the noise or SNR of the input signal $x_k$.

For instance, to calculate the cut-off frequency of the adaptative high pass filter 603 a linear function is fit for each time interval to the per-bin SNR curve of the input signal $x_k$ and the frequency at which that linear function crosses a chosen SNR value is selected as the cutoff frequency for the adaptative high pass filter 603.

In an alternative embodiment, the cut-off frequency of the adaptative high pass filter 603 may be calculated based on the SNR calculated in frequency by determining the frequency range in which noise dominates over speech making it unusable in the power calculation means 405. In this way, the lowest frequencies (usually up to 300 Hz because that's where most of car noise power is concentrated) are filtered out. In an alternative embodiment, the power calculation means 405 may not comprise the adaptative high pass filter 603.

The power calculation means 405 may comprise further a filter bank 605 configured to split the signal filtered by the adaptative high pass frequency filter 603 into bands. This may be performed by using a set of two or more filters through which the signal is passed in parallel to split it into subbands such that the frequency range of the input signal is split into a corresponding number of frequency subranges or subbands. In a possible embodiment, the input signals may be sampled at 16 kilohertz (kHz) and the input signal may be split then in a first band below 4 kHz and a second band above 4 kHz. This is a very efficient implementation providing high performance for a car, wherein the noise is usually located below the 4 kilohertz.

The power calculation means 405 comprises as many band power calculation means 607 as the number of bands into which the input signal has been split by the filter banks 605 configured to calculate the power of each band separately as:

$$\text{Power}_{k,n} = \sum_{m=1}^{M} x_{k,n}^2[m]/M \qquad \text{(equation 1)}$$

Where $\text{Power}_{k,n}$ is the power of band n of input signal $x_k$. $x_{k,n}[m]$ are current frame samples of the input signal $x_k$ of band n and M is the number of samples per frame in current time interval.

The power calculation means 405 comprises further power mixing means 608 configured to calculate a weighting factor or power weight value for each band or frequency subrange. The plurality of power weight values of the plurality of frequency subranges may be calculated as a ratio between the SNR of the input signal in the corresponding frequency subrange or band and an average SNR of the input signal in the plurality of frequency subranges or bands.

The power of each frequency subrange or band may be weighted by applying corresponding power weight value and adding the weighted energies. This allows to weight differently the contribution of each subrange or band to the calculation of the current power values such that subranges with higher noise contribute less.

As said, the weighting factors or power weight values are estimated using SNR, wherein the SNR for each band is calculated by averaging the SNR of all bins in that band and limiting it to [0, 20] dB range. The weighting factor or power weight value $w_n$ for a band n is calculated as follows:

$$SNRdb_n = \sum_{l=l_{n0}}^{l_{n0}+L_n-1} SNR[l]/L_n \qquad \text{(equation 2)}$$

$$SNRdb_n = \max(SNRdb_n, 0) \qquad \text{(equation 3)}$$

$$SNRdb_n = \min(SNRdb_n, 20) \qquad \text{(equation 4)}$$

$$SNRlin_n = 10^{\frac{SNRdB_n}{20}} \qquad \text{(equation 5)}$$

$$w_n = SNRlin_n / \sum_{i=1}^{N} SNRlin_i \qquad \text{(equation 6)}$$

Wherein $SNRlin_n$ in equations 5 and 6 is the average SNR in linear scale for band n, N in equation 6 is the number of subbands, SNR[l] in equation 2 is the SNR in Decibels (dB) calculated per frequency bin, where l is the bin number, $L_n$ in equation 2 is the number of bins in band n, and $l_{n0}$ in equation 2 is the number of the first bin in the band.

And wherein $SNRdb_n$ in equations 2, 3, 4 and 5 is the average SNR (in dB) for band n limited to [0,20] dB range such that, if the SNR of band n is above 20 dB then the SNR of that band is set to 20 dB, if the SNR of band n is below 0 dB, the SNR of that band is set to 0, and if the SNR is in the range between 0 and 20, the SNR for that band is set to the estimated value. This is a non-limiting implementation, and a different range could be chosen.

The power mixing means 608 is further configured to calculate a weighted sum of powers from all bands or frequency subranges as:

$$\text{Power}_k = \sum_{n=1}^{N} w_n \cdot \text{Power}_{k,n} \quad \text{(equation 7)}$$

Wherein $w_n$ represents the weight for subband n, and $\text{Power}_{k,n}$ represents the power of the input signal $x_k$ in subband n.

The result of the weighted sum of the band energies can be then smoothed by, for instance, a 0.5 smoothing factor, and the current power values for the input signals are calculated for the current frame or current time interval as shown below, wherein a previous frame indicates one frame before the current frame:

$$PowerS_k[\text{current\_frame}] = 0.5 \cdot PowerS_k[\text{previous\_frame}] + 0.5 \cdot \text{Power}_k[\text{current\_frame}] \quad \text{(equation 8)}$$

The power calculation means 405 provides the current power values to the probability estimation means 407 to be used to estimate the probabilities of each microphone being closest to currently active speaker. The goal is to update the probabilities fast when the talker changes but at the same time to avoid level fluctuations and random switching when more than one person is speaking. The probability calculation means 407 is configured to smooth the current power values of all input signals in the following way.

If speech is detected. i.e., if the VAD is higher than threshold value, and echo is not dominating over speech, i.e. far end probability is lower than another threshold value, all the current power values are smoothed as follows:

$$PowerSmooth_k[\text{current\_frame}] = (1-\alpha) \cdot PowerS_k[\text{current\_frame}] + \alpha \cdot PowerSmooth_k[\text{previous\_frame}] \quad \text{(equation 9)}$$

This is part of probability estimation but the first step of it is to smooth the powers properly. This smoothing step contributes to the good performance of the algo. The previous smoothing described above is not necessary, it is customary to smooth out power estimates so that they are less "jittery". The two smoothing procedures are different: the first one is done the same way for all frames, this is done differently using VAD.

Choosing a lower smoothing factor α will allow to update faster the probabilities 425 when talkers change but might cause level fluctuations when multiple talkers are active.

If speech is detected in at least one of the input signals but echo is dominating over speech (far end probability higher than the another threshold), or if speech is not detected, then each current power value will be smoothed towards the average of all previous power values. If the echo is high, all microphones should be equally mixed as it is not possible to estimate properly the speech level. By resetting the current smoothed power value towards the average of the smoothed power values of all channels, the probabilities 425 can update faster towards a new speaker after a pause in speech (i.e., when only noise is present in the input signals).

Then the current smoothed power values are calculated as follows:

$$PowerSmooth_k[\text{current\_frame}] = (1-\beta) \cdot \sum_{k=1}^{K} PowerSmooth_k[\text{previous\_frame}] / K + \cdot + \beta \cdot PowerSmooth_k[\text{previous\_frame}] \quad \text{(equation 10)}$$

Again, lower β enables faster switching towards new conditions but too low value can result in level fluctuations (after short pauses in speech when the same person is talking). As said, the lower β will result in faster switching to new speaker and the higher β will result in slower switching. The current smoothed power value is based on the determined value $$\sum_{k=1}^{K} PowerSmooth_k[\text{previous\_frame}] / K$$

and the previous smoothed power value corresponding to each input signal $\text{PowerSmooth}_k$[previous_frame]. The current smoothed power value is determined by smoothing between the determined value $$\sum_{k=1}^{K} PowerSmooth_k[\text{previous\_frame}] / K$$

and the previous smoothed power value corresponding to each input signal $\text{PowerSmooth}_k$[previous_frame].

After that, the probability estimation means 407 calculates for all input signals the ratio between the current smoothed power value of each input signal and the average of all the current smoothed power values for all the input signals:

$$PowerRatio_k[\text{current frame}] = PowerSmooth_k[\text{current frame}] / \left(\sum_{k=1}^{K} PowerSmooth_k[\text{current frame}] / K\right) \quad \text{(equation 11)}$$

$$\text{Update first time: } PowerRatio_k[\text{current frame}] = \sqrt[2]{PowerRatio_k[\text{current frame}]} / K \quad \text{(equation 12)}$$

After that, the ratio is updated such that:

$$PowerRatio_k[\text{current frame}] = \max(PowerRatio_k[\text{current frame}], LowThr) \quad \text{(equation 13)}$$

And such that:

$$PowerRatio_k[\text{current frame}] = \min(PowerRatio_k[\text{current frame}], HighThr) \quad \text{(equation 14)}$$

The two thresholds LowThr and HighThr may be chosen empirically to provide the optimal performance. The range of power ratios is limited between the two thresholds to later map them to a [0,1] range as follows:

$$PowerRatio_k[\text{current frame}] = (PowerRatio_k[\text{current frame}] - LowThr)/(HighThr - LowThr) \quad \text{(equation 15)}$$

In this way, for a chosen input signal if the power ratio reaches the threshold HighThr, the microphone corresponding to that input signal will have assigned a probability of one. If the power ratio is equal to or below the other threshold LowThr, the microphone corresponding to that input signal will have assigned a probability of zero.

The power ratios for all channels are then normalized so that their sum is 1 as follows:

$$Prob_k[\text{current frame}] = PowerRatio_k[\text{current frame}]/\sum_1^K PowerRatio_k[\text{current frame}] \quad \text{(equation 16)}$$

Equations 12-15 are used to map power ratio (which in theory can be any positive number) to [0,1] range which is the range of probability. This mapping can be done by using all 3 equations. When going directly from equation 12 to equation 16, probabilities in range [0,1] will also be obtained, but by choosing LowThr and HighThr, this mapping is controlled. For example, in a 2-channel scenario when power estimated for channel 1 is higher than the one estimated for channel 2 enough to be certain that the active talker is closer to the microphone corresponding to channel 1, channel 1 should have probability equal to 1 assigned and channel 2 probability equal to 0. However, since the power of channel 2 is not 0, the power ratio for this channel will also be nonzero and if equations 13-15 are not used the probability assigned to channel 2 will also be higher than 0. Instead, if LowThr and HighThr values are chosen properly it can be ensured that with a significant difference between the powers of the two channels one of them will always have a zero probability assigned. To gain further stability in the speech and noise levels additional modifications can be added before normalization.

The probabilities 425 can be adjusted based on soft VAD, which may be in [0,1] range. The VAD indicates which frames of the input signal contain speech and which don't. It can have a binary value (0 or 1) or continuous value between 0 and 1 (so called soft VAD). In the latter case it represents the probability of speech being present in the frame.

The probabilities 425 can be adjusted based on soft VAD as follows:

$$Prob_k[\text{current frame}] = VAD \cdot Prob_k[\text{current frame}] + (1 - VAD) \cdot 1/K \quad \text{(equation 17)}$$

Wherein 1/K is the probability which, if assigned to all input signals, means that all input signals have the same SNR, such that none is better than the others. If all input signals have this probability assigned, they are mixed in equal proportions (with the same mixing factors or weights).

Equations 9 and 10 provide different ways of calculating the smoothed power depending on speech presence in the current frame. However, this is done using so called hard VAD-one that takes only values 1 or 0. Instead, equation 17 allows to modify the probabilities 425 based on soft VAD value. This soft VAD, contrary to hard speech presence decision yes/no, corresponds to a speech presence probability. When the speech presence probability is lower for a frame it means that the speech level/SNR is lower so the risk of wrongly estimating the power and probabilities for each channel is higher. Weighting the probabilities with the soft VAD allows to reduce errors and have a smoother mixed output (without level fluctuations). Additionally, whenever VAD is 0 all probabilities 425 are set to 1/K so all microphones are mixed in with the same mixing factors which allows to keep the same noise characteristics throughout the mixed output.

After applying equation 17, the probability is weighted with SNR. For instance, by applying a sigmoid function on the SNR averaged over all bands as follows:

$$Prob_k[\text{current frame}] = SNRw \cdot Prob_k[\text{current frame}] + (1 - SNRw) \cdot 1/K \quad \text{(equation 18)}$$

$$SNRw = f(SNRaverage)$$

$$SNRaverage = \sum_1^N SNDdb_n \quad \text{(equation 19)}$$

Wherein SNRw is a function of SNRaverage.

In very low SNR conditions, the calculation of energy per channel is more prone to error, which can cause level fluctuation of speech when multiple talkers are active. On the other hand, in such bad SNR conditions the difference in SNR on the microphones that are closer and further from the active talker (in a small space like car) becomes less significant. It is therefore better in low SNR conditions to mix microphones more equally and avoid the level fluctuations than to try to find the microphone closest to the active talker and risk making an error. In better SNR conditions, it is better to detect the closest microphone to the speaker and assign the highest mixing factor (probability) to it. By using equation 18 this can be achieved.

Alternatively, equations 17 and 18 could be used in reversed order.

SNR can be a feature calculated in many ways. It can be estimated for the whole signal to address general noise conditions, per frame (1 value for each frame) or per band (in every frame, 1 value for every band the signal is split into). SNR per bin, calculated in frequency domain, is a specific version of SNR per band (if short-time Fourier Transform, STFT, is viewed as a filter bank)—SNR estimate comprises of multiple values of SNR per frame, one for each frequency bin. The SNR calculated in frequency domain can be replaced by:

a. stationary noise level/power estimated per band-equally mixed input signals could be passed through simple analysis filter bank and for each subband and the noise floor level could be estimated using e.g. minimum statistics
b. SNR estimated per band-instead of calculating per-bin SNR in frequency domain, SNR could be calculated per band by calculating noise level/power and adding speech level/power tracking in each band; then SNR could be calculated as the ratio of speech to noise power
c. noise model for the targeted car supported with external information about the speed.

At the cost of increased complexity the power calculation means 405 and/or the probabilities estimation means 407 could be implemented in frequency domain.

The biggest advantage of the disclosure is that by using low complexity processing we can provide robustness to high noise level.

In previous solutions either no preprocessing was present, which made them suitable for quiet environments only. Or only VAD was added, which improved performance in noise, but the solutions would still fail in very high level noise. Or full enhancement of each microphone input was done before mixing, which made it robust to noise but increased the complexity significantly.

The disclosure provides simple pre-processing before mixing-after that the full enhancement can be done on the output of the mixing means only. This is very important in case of supporting many microphones as only a small part of the algorithm has to be repeated for each microphone.

The disclosure provides an apparatus for mixing a plurality of input signals, the apparatus comprising a memory and a processor communicatively connected to the memory and configured to execute instructions to perform the method according to the embodiments in the invention.

The disclosure provides a computer program which is arranged to perform the method according to the embodiments in the invention.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims.

In particular, combinations of specific features of various aspects of the disclosure may be made. An aspect of the disclosure may be further advantageously enhanced by adding a feature that was described in relation to another aspect of the invention.

It is to be understood that the disclosure is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

What is claimed is:

1. A method for mixing a plurality of input signals associated respectively with a plurality of microphones wherein each of the plurality of input signals comprises sound events generated by a one or more sound sources, the method comprising:

receiving, by a processor, a plurality of previous smoothed power values associated to a previous time interval, and a plurality of current power values corresponds respectively to each of the plurality of input signals;

determining, by the processor, whether at least one of the plurality of input signals contains speech;

calculating, by the processor, a plurality of current smoothed power values respectively for the plurality of input signals at a current time interval based on the plurality of previous smoothed power values associated to the previous time interval; and mixing the plurality of input signals based on the plurality of current smoothed power values, wherein the calculating the plurality of current smoothed power values comprises calculating a current smoothed power value for each input signal of the plurality of input signals based on whether at least one of the plurality of input signals contains speech; and wherein the mixing the plurality of input signals comprises calculating a plurality of mixing gains for the plurality of input signals and a mixing gain among the plurality of mixing gains for an input signal among the plurality of input signals is determined based on a current smoothed power value among the plurality of current smoothed power values corresponding to the input signal.

2. The method according to claim 1, wherein the calculating the plurality of current smoothed power values comprises:

when it is determined that at least one of the plurality of input signals contains speech and echo is not dominating over speech, calculating the current smoothed power value for each input signal based on a current power value among a plurality of current power values and a previous smoothed power value among the plurality of previous smoothed power values, wherein each of the plurality of previous smoothed power values corresponds respectively to each of the plurality of input signals, and the current power value and the previous smoothed power value correspond to each input signal; and when it is determined that none of the plurality of input signals contains speech or it is determined that at least one of the plurality of input signals contains speech but the echo dominates over speech, calculating for each input signal current smoothed power value based on a determined value and the previous smoothed power value corresponding to each input signal.

3. The method according to claim 2, wherein the calculating for each input signal current smoothed power value based on the determined value and the previous smoothed power value corresponding to each input signal comprises that the current smoothed power value is determined by smoothing between the determined value and the previous smoothed power value corresponding to each input signal and wherein the determined value is an average of the plurality of previous smoothed power values.

4. The method according to claim 1, wherein one of the plurality of mixing gains are further determined based on a power ratio between the current smoothed power value of a input signal and an average of the plurality of current smoothed power values of the plurality of input signals.

5. The method according to claim 4, wherein one of the plurality of mixing gains is further determined by a first updated power ratio, wherein the first updated power ratio equals to the square root of the power ratio diving divided by a number of the plurality of input signals.

6. The method according to claim 5, wherein one of the plurality of mixing gains are further determined by a second updated power ratio, wherein if the first updated power ratio is greater than a high threshold the second updated power ratio is determined to be the high threshold, if the first updated power ratio is not greater than a low threshold, the second updated power ratio is determined to be the low threshold, and if the second updated power ratio is determined to be not greater than the high threshold and greater than the low threshold, the second updated power ratio is determined to be the first updated power ratio, wherein the high threshold is greater than the low threshold.

7. The method according to claim 6, wherein one of plurality of mixing gains is determined as a ratio between a third updated power ratio and a sum of the plurality of the third updated power ratios, wherein the third updated power ratio is equal to a division between the second updated power ratio minus the low threshold and the high threshold minus the low threshold.

8. The method according to claim 1, wherein the plurality of mixing gains are determined based on the probabilities of speech or Signal to Noise Ratio (SNR).

9. The method according to claim 8, the method further comprising at least one of operations (a) and (b), wherein the operation (a) includes:

determining each mixing gain of the plurality of mixing gains based on Voice Activity Detection ranging between 0 to 1 and a value 1/K, wherein K is a number of the plurality of input signals; and, the operation (b) includes:

determining each mixing gain of the plurality of mixing gains based on Signal-to-Noise Ratio (SNR) of the plurality of input signals.

10. The method according to claim 1, the method further comprising:

splitting a frequency range of an input signal among the plurality of inputs signals into a plurality of frequency subranges;

calculating a plurality of power weight values respectively for the plurality of frequency subranges based on the Signal to Noise Ratio, SNR, of the input signal in corresponding frequency subrange; and calculating a current power value among the plurality of current power values based on the plurality of power weight values.

11. The method according to claim 10, wherein the plurality of power weight values of the plurality of frequency subranges is calculated as a ratio between the average SNR of the input signal in corresponding frequency subrange and a sum of the plurality of the average SNR of the input signal in the plurality of frequency subranges.

12. The method according to claim 10, wherein the calculating the current power value based on the plurality of power weight values comprises weighing power of each frequency subrange of the plurality of frequency subrange by applying corresponding power weight among the plurality of power weight values to the power of the input signal of the corresponding subband and calculating a sum of the weighted powers of the plurality of the subbands for the input signals.

13. The method according to claim 1, wherein the plurality of input signals comprise microphone signals from microphones which are located more than 25 centimetres from each other, and the plurality of input signals further comprise output of the beamformer whose input are microphone signals from microphones which are located no more than 25 centimetres from each other.

14. An apparatus for mixing a plurality of input signals associated respectively with a plurality of microphones wherein each of the plurality of input signals comprises sound events generated by a one or more sound sources, the apparatus comprising a memory and a processor communicatively connected to the memory and configured to execute instructions to perform a method for mixing the plurality of input signals, the method comprising:

receiving, by a processor, a plurality of previous smoothed power values associated to a previous time interval, and a plurality of current power values corresponds respectively to each of the plurality of input signals;

determining, by the processor, whether at least one of the plurality of input signals contains speech;

calculating, by the processor, a plurality of current smoothed power values respectively for the plurality of input signals at a current time interval based on the plurality of previous smoothed power values associated to the previous time interval; and mixing the plurality of input signals based on the plurality of current smoothed power values, wherein the calculating the plurality of current smoothed power values comprises calculating a current smoothed power value for each input signal of the plurality of input signals based on whether at least one of the plurality of input signals contains speech; and wherein the mixing the plurality of input signals comprises calculating a plurality of mixing gains for the plurality of input signals and a mixing gain among the plurality of mixing gains for an input signal among the plurality of input signals is determined based on a current smoothed power value among the plurality of current smoothed power values corresponding to the input signal.

15. The apparatus according to claim 14, wherein the calculating the plurality of current smoothed power values comprises:

when it is determined that at least one of the plurality of input signals contains speech and echo dominates over speech, calculating the current smoothed power value for each input signal based on a current power value among a plurality of current power values and a previous smoothed power value among the plurality of previous smoothed power values, wherein each of the plurality of previous smoothed power values corresponds respectively to each of the plurality of input signals, the current power value and the previous smoothed power value correspond to each input signal; and when it is determined that none of the plurality of input signals contains speech or it is determined that at least one of the plurality of input signals contains speech but the echo dominates over speech, calculating for each input signal current smoothed power value based on a determined value and the previous smoothed power value corresponding to each input signal.

16. The apparatus according to claim 15, wherein the calculating for each input signal current smoothed power value based on the determined value and the previous smoothed power value corresponding to each input signal comprises that the current smoothed power value is determined by smoothing between the determined value and the previous smoothed power value corresponding to each input signal and wherein the determined value is an average of the plurality of previous smoothed power values.

17. The apparatus according to claim 14, wherein one of the plurality of mixing gains are further determined based on a power ratio between the current smoothed power value of a input signal and an average of the plurality of current smoothed power values of the plurality of input signals.

18. The apparatus according to claim 17, wherein one of the plurality of mixing gains is further determined by a first updated power ratio, and the first updated power ratio equals to a square root of the power ratio divided by a number of the plurality of input signals.

19. The apparatus according to claim 18, wherein one of the plurality of mixing gains are further determined by a second updated power ratio, wherein if the first updated power ratio is greater than a high threshold the second updated power ratio is determined to be the high threshold, if the first updated power ratio is not greater than a low threshold, the second updated power ratio is determined to be the low threshold, and if the second updated power ratio is determined to be not greater than the high threshold and greater than the low threshold, the second updated power ratio is determined to be the first updated power ratio, wherein the high threshold is greater than the low threshold.

20. A non-transitory computer program product comprising instructions executable to perform a method for mixing the plurality of input signals associated respectively with a plurality of microphones wherein each of the plurality of input signals comprises sound events generated by a one or more sound sources, the method comprising:

receiving, by a processor, a plurality of previous smoothed power values associated to a previous time interval, wherein each of a plurality of current power values corresponds respectively to each of the plurality of input signals;

determining, by the processor, whether at least one of the plurality of input signals contains speech;

calculating, by the processor, a plurality of current smoothed power values respectively for the plurality of input signals at a current time interval based on the plurality of previous smoothed power values associated to the previous time interval; and mixing the plurality of input signals based on the plurality of current smoothed power values, wherein the calculating the plurality of current smoothed power values comprises calculating a current smoothed power value for each input signal of the plurality of input signals based on whether at least one of the plurality of input signals contains speech; and wherein the mixing the plurality of input signals comprises calculating a plurality of mixing gains for the plurality of input signals and a mixing gain among the plurality of mixing gains for an input signal among the plurality of input signals is determined based on a current smoothed power value among the plurality of current smoothed power values corresponding to the input signal.

* * * * *